N. HERZMARK.
CABLE FOR THE TRANSMISSION OF MECHANICAL MOVEMENTS.
APPLICATION FILED DEC. 18, 1911.
1,049,233.
Patented Dec. 31, 1912.
2 SHEETS—SHEET 1.
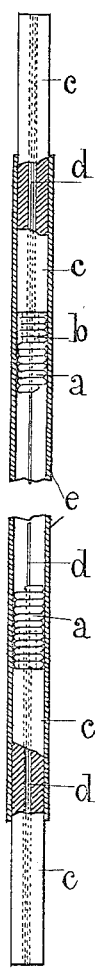
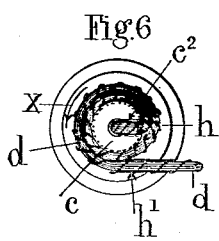
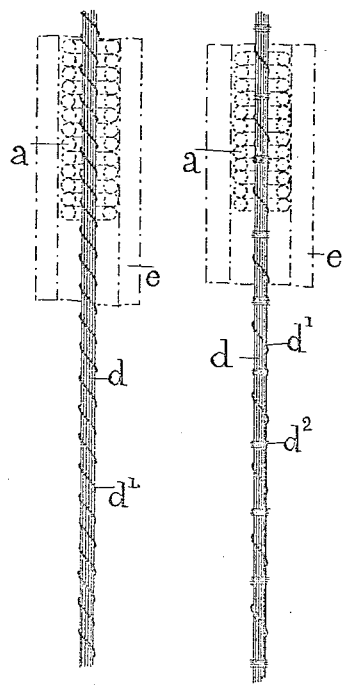
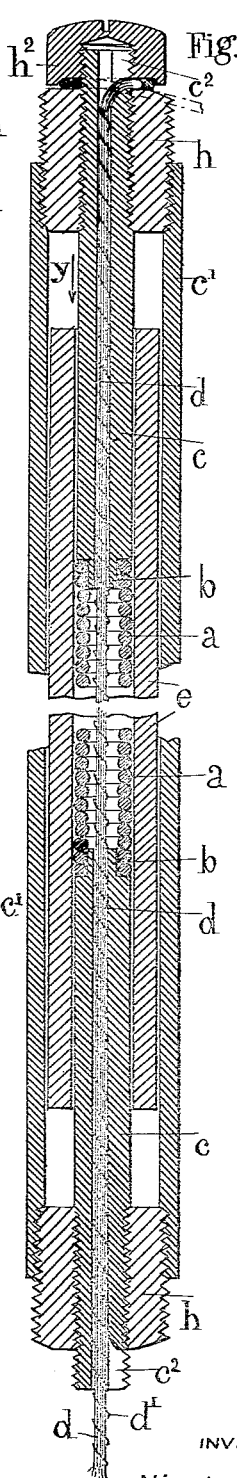
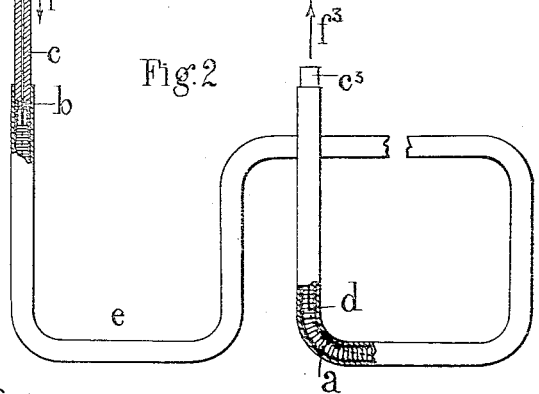
INVENTOR
Nicolas Herzmark
BY Munn & Co
ATTORNEYS
WITNESSES
Sidney Brooks

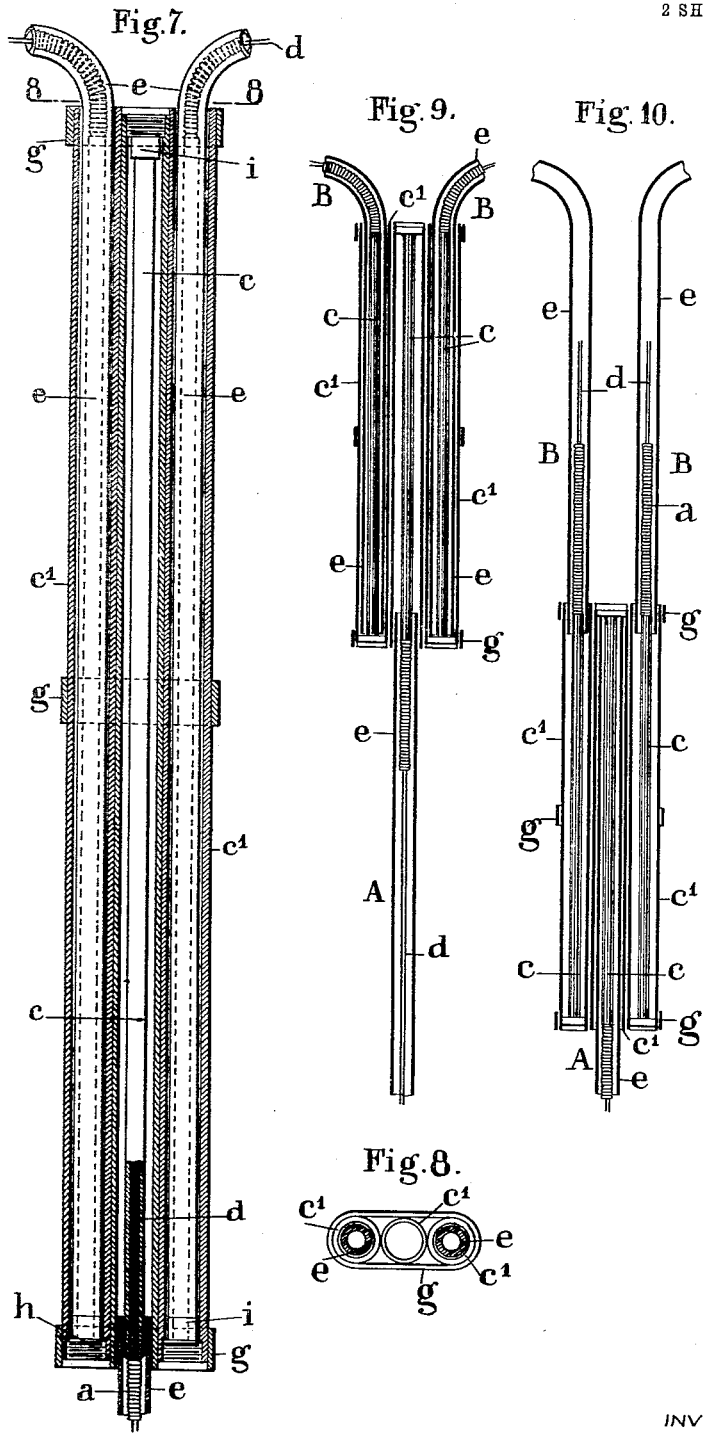

UNITED STATES PATENT OFFICE.

NICOLAS HERZMARK, OF PARIS, FRANCE.

CABLE FOR THE TRANSMISSION OF MECHANICAL MOVEMENTS.

1,049,233.

Specification of Letters Patent. Patented Dec. 31, 1912.

Application filed December 18, 1911. Serial No. 666,539.

*To all whom it may concern:*

Be it known that I, NICOLAS HERZMARK, a subject of the Emperor of Russia, and a resident of 7 Rue de Poliveau, Paris, France, have invented certain new and useful Improvements in and Relating to Cables for the Transmission of Mechanical Movements, of which the following is a specification.

The present invention has for its object a flexible cable for the transmission of mechanical movements of all kinds capable of acting by traction without stretching and by compression without becoming shortened.

It consists broadly of a core constituted by one or more wires contained in the interior of a tubular helicoidal winding with contiguous spirals, the core being in permanent tension between two stops which bear at each extremity of the cable upon the helicoidal winding. The whole is inclosed in a guide envelop or sheath in which it is able to slide. The permanent tension to which the core is subjected is greater than the maximum tractional effort that the cable has to transmit in use. Consequently the core does not experience any extension during use because the tractional efforts that it then transmits are smaller than those that the extension that it permanently presents have imparted to it. Furthermore the transmission of the compression strains takes place in an exceedingly precise manner; the convolutions of the helicoidal winding are always maintained in compression between the stops to which the core is attached in such a manner that no play can exist between the convolutions.

Various constructional forms of the object of the invention are illustrated by way of example in the accompanying drawing, in which:

Figure 1 is a view of a flexible cable with a straight sheath partly in section. Fig. 2 is a view of a flexible cable with a bent sheath partly in section. Figs. 3 and 4 show two constructional forms of core. Fig. 5 shows a method of mounting the cable in section. Fig. 6 is a plan view corresponding to Fig. 5 with the fixing plug removed. Fig. 7 is a longitudinal section of a two-way branch. Fig. 8 is a section on the line 8—8 in Fig. 7. Figs. 9 and 10 illustrate diagrammatically the two extreme positions of the branch in Figs. 7 and 8.

$a$ (Figs. 1 and 2) is the helicoidal winding engaged at the two ends upon the reduced extremity $b$ of rods $c$ which constitute the stops between which the core $d$ is stretched. The core $d$ enters a central passage formed in the rods $c$ and is fixed there in any convenient manner such for example as by soldering; $e$ is the guide sheath or casing. The play which exists between the winding $a$ and the sheath $e$ is insufficient to enable the convolutions to move relatively to each other and to overlap each other. The compression strains are transmitted by the intermediary of the helicoidal winding $a$ which acts in the manner of an incompressible tube and which is nevertheless able to follow all the desired inflections. The tractional strains are transmitted by the wire or wires which constitute the core $d$. The sheath $e$ may be rigid, semiflexible or perfectly flexible. It may be bent at any angles however acute in such a manner that the cable can be employed for any control or transmission by fixing the sheath along fixed support as in the case of a conduit pipe or the wire of an electric cable. The core $d$ should present a section capable of resisting the tractional strains to which the cable will have to be subjected. It is advantageous to distribute this section over as large a number of wires as possible in order to constitute the core by means of fine wires presenting the maximum flexibility. Fig. 2 shows a cable in accordance with the invention the sheath of which presents numerous bends. On pressing the rod $c$ in the direction indicated by the arrow $f$ the rod $c^3$ is displaced by the same amount in the direction indicated by the arrow $f^3$. On pulling the rod $c$ in the opposite direction the rod $c^3$ is caused to reënter the sheath by a corresponding amount. A movement of any kind can thus be transmitted to any desired distance.

The core $d$ (Figs. 3 and 4) is preferably constituted by means of wires of the same nature and section. These wires are grouped in a parallel bundle and are individually subjected to the same tension by any convenient means. In this condition they are firmly tied by means of a wire $d'$ which can be arranged for example in accordance with a regular helicoidal winding as represented in Fig. 3. In the construction illustrated in Fig. 4 the helicoidal winding $d'$ presents at uniform intervals zones $d^2$ in which the convolutions are very close together. This arrangement prevents the wire $d'$ from unwinding when the cable has to be cut for any reason. The cores $d$ thus prepared are constituted by wires arranged in absolutely identical conditions. At the time of fitting, the core and the helicoidal windings are introduced into the sheath and the core is fixed to one of the extreme stops $c$. Then bearing on the helicoidal winding the core is placed in tension by subjecting it to a tractional strain greater than the maximum strain than it will have to withstand in service and its second end is fixed to the second stop $c$. The preparation of the core in accordance with Figs. 3 and 4 serves to bring the wires which constitute it into identical positions as far as possible, as explained above. Consequently when the core is placed under tension at the time of fitting these several wires will exactly share the strain and concur to an equal extent in furnishing the strength of the core. If this precaution were not taken, only a few of the wires of the core might bear the whole strain while the other wires would perform no work.

Figs. 5 and 6 show a special method of fitting the cable. The straight wires of which the core $d$ is constituted are connected with the corresponding rod $c$ in the following manner: The rod $c$ comprises a central passage through which the core passes; it is provided at its upper part with a vertical recess $c^2$ enabling the core $d$ to be turned over so as to wind it once or a larger number of times around the body of the said rod. The core $d$ is then engaged in a transverse notch $h'$ formed on the outer face of the part $h$ and is held in this position by a cap $h^2$ screwed on the rod $c$. It should be noted that the notch $h'$ of the part $h$ is formed in such a manner as to enable the bundle of wires $d$ to be wound around the rod $c$ in the direction indicated by the arrow $x$, this arrangement serving to prevent the cap $h^2$ from becoming unscrewed when the cable is actuated by its opposite movement in the direction indicated by the arrow $y$ because in these conditions the bundle of wires $d$ has a tendency to displace the said cap $h'$ in the direction for screwing it up. The arrangement just described is specially adapted for placing the core in tension at the moment of fitting. One of the extremities of the core (the upper extremity Fig. 5) being fixed, the tubular helicoidal winding is passed over the core $d$ inside the sheath $e$ whereupon the core $d$ is engaged in the rod $c$ which constitutes the second extremity of the cable. Then bearing upon the corresponding part $h$ a tractional effort is exerted upon the core $d$ by any convenient mechanical means which is greater than the maximum tractional strain to which the cable will be subjected in use. The core $d$ is turned down into the vertical recess $c^2$ and wound around the rod $c$ while the tension is maintained the plug $h^2$ is then arranged in place, and fully tightened the tension mechanism is then released. The core $d$ then tends to shorten but is prevented from doing so by the convolutions of the windings $a$ which are placed in compression so that the core $d$ retains its length. Each extremity of the cable is also provided with a device serving to guide the rod $c$ during its displacement. This device consists of a tube $c'$ connected with the rod $c$ and which is engaged with easy friction on the rigid sheath $e$. The tube $c'$ is of suitable dimensions for insuring the guidance of the rod $c$ throughout the entire length of its displacement. The result of the arrangement is to increase the strength of the rod $c$ which can therefore be of very small diameter even in the case of relatively high strains. Furthermore the tube $c'$ forms a casing and prevents the introduction of dust into the sheath. The connection between the tube $c'$ and the rod $c$ may be effected in any convenient manner, for example by screwing as shown in Fig. 5. It is possible to branch off the control cable coming from a transmitting station several other cables going in different directions and each terminating at a receiving station.

Figs. 7 and 8 show a two-way branch of this type in which at the operating end the straight push or pull imparted to the cable need only be twice the displacement desired, whatever the number of parts controlled may be.

Figs. 9 and 10 represent diagrammatically the two extreme positions of this branching device. The rigid rod $c$ in which the operating length A ends is rendered integral with the rigid extremities of the cables B connected with the parts to be operated. This connection is obtained by the intermediary of the guide tubes $c'$ arranged parallel one with the other and connected one with the other in any suitable manner, for example by means of hoops $g$.

As shown in Figs. 7, 9 and 10 the rigid extremities $c$ of each cable B to be actuated are arranged inversely relatively to the rigid extremity of the control cable A and at a distance from this extremity which is equal to the travel. In this manner when the length A is actuated it displaces the lengths B by the intermediary of the rods $c$ and of the guide tubes $c'$ and brings the entire system into the position shown in Fig. 10. It follows from such an arrangement that whatever the number of lengths B may be the system as a whole only requires for its displacement a length equal to twice the travel of the controlled parts. In the example illustrated it has been assumed that the controlled lengths B are two in number. The lengths A and B can also be arranged in the same direction and the extremities of their rods united one with the other. The operating cable then works by traction while the operated cables work by compression and vice versa. This latter arrangement reduced to two branches may be utilized as a relay for transforming the tractional movement of a length into a movement of compression of the second length and vice versa.

Having now particularly described and ascertained the nature of my said invention and in what manner the same is to be performed, I declare that what I claim is:—

1. In a device for transmitting power, a flexible core comprising a series of parallel wires, flexible means for securing said wires together, a tubular, helicoidal winding having contiguous convolutions arranged to surround said core, and a guide sheath for said tubular helicoidal winding.

2. In a device for transmitting power, a flexible core comprising a series of parallel wires, a flexible member wound around said parallel wires for holding them together, a tubular helicoidal winding disposed about said core and spaced therefrom, said helicoidal winding having contiguous convolutions, and an external guide sheath for said helicoidal winding.

3. In a device for transmitting power, a flexible core comprising a series of parallel wires, a flexible member wound around said parallel wires for holding them together, a tubular helicoidal winding disposed about said core and spaced therefrom, said helicoidal winding having contiguous convolutions, an external guide sheath for said helicoidal winding, and a rigid rod secured to each end of said helicoidal winding and said flexible core.

4. In a device for transmitting power, a flexible core comprising a series of parallel wires, a flexible member wound around said parallel wires for holding them together, a tubular helicoidal winding disposed about said core and spaced therefrom, said helicoidal winding having contiguous convolutions, an external guide sheath for said helicoidal winding, a rigid rod arranged to enter each end of said sheath, said rigid rod being hollow, the end of the rod being in engagement with said helicoidal winding, the flexible core passing through the rod, and means carried by the outer end of the rod for securing said flexible core to the rod.

In testimony whereof I have signed my name to this specification, in the presence of two subscribing witnesses.

NICOLAS HERZMARK.

Witnesses:
CHARLES DOUY,
LÉON PEILLET.